US008699595B2

(12) United States Patent
Martinez

(10) Patent No.: US 8,699,595 B2
(45) Date of Patent: Apr. 15, 2014

(54) INTEGRATED CIRCUIT WITH CHANNEL ESTIMATION MODULE AND METHOD THEREFOR

(75) Inventor: Vincent Martinez, Castres (FR)

(73) Assignee: Freescale Semiconductor, Inc., Austin, TX (US)

(*) Notice: Subject to any disclaimer, the term of this patent is extended or adjusted under 35 U.S.C. 154(b) by 0 days.

(21) Appl. No.: 13/322,944

(22) PCT Filed: Jun. 29, 2009

(86) PCT No.: PCT/IB2009/053233
§ 371 (c)(1),
(2), (4) Date: Nov. 29, 2011

(87) PCT Pub. No.: WO2011/001226
PCT Pub. Date: Jan. 6, 2011

(65) Prior Publication Data
US 2012/0087428 A1 Apr. 12, 2012

(51) Int. Cl.
*H04L 27/28* (2006.01)
*H04L 27/00* (2006.01)

(52) U.S. Cl.
USPC ........... 375/260; 375/267; 375/259; 375/326; 375/316; 375/324; 375/322; 375/350; 375/346; 370/208; 370/203; 370/329; 370/328; 370/310; 370/241; 370/252

(58) Field of Classification Search
USPC ......... 375/260, 326, 350, 267, 259, 316, 324, 375/322, 346; 370/208, 252, 329, 328, 310, 370/203, 241
See application file for complete search history.

(56) References Cited

U.S. PATENT DOCUMENTS 8,155,173 B2 * 4/2012 Oketani et al. ................ 375/219
2008/0062859 A1 3/2008 Le Saux et al.
(Continued)

FOREIGN PATENT DOCUMENTS

WO WO 2004/073276 * 8/2004 ............. H04L 27/26

OTHER PUBLICATIONS

Miao, George J., Signal Processing for Digital Communications, Dec. 2006, Artech House, p. 479.*

(Continued)

*Primary Examiner* — Chieh M Fan
*Assistant Examiner* — Michelle M Koeth

(57) ABSTRACT

An integrated circuit comprises channel estimation module for generating at least one channel estimation signal based on at least one of a plurality of pilot signals within concurrent resource elements. The channel estimation module comprising extension module arranged to receive a demodulation reference signal comprises the plurality of pilot signals and to add an extension to the demodulation reference signal, inverse discrete Fourier transform (IDFT) module arranged to perform an inverse discrete Fourier transform function on the extended demodulation reference signal to generate a time domain reference signal, reference signal separation module arranged to separate out at least one pilot signal component from the time domain reference signal. The channel estimation module further comprises and discrete Fourier transform (DFT) module arranged to perform a discrete Fourier transform function on the at least one pilot signal component to generate at least one extended channel estimation signal.

18 Claims, 9 Drawing Sheets

(56) References Cited

U.S. PATENT DOCUMENTS

| | | | |
|---|---|---|---|
| 2008/0101483 A1* | 5/2008 | Aziz | 375/260 |
| 2008/0304605 A1 | 12/2008 | Aziz et al. | |
| 2010/0195518 A1* | 8/2010 | McCloud et al. | 370/252 |
| 2011/0122789 A1* | 5/2011 | Haustein et al. | 370/252 |
| 2011/0268028 A1* | 11/2011 | Stern-Berkowitz et al. | 370/328 |
| 2011/0299625 A1* | 12/2011 | Hooli et al. | 375/295 |
| 2012/0087427 A1* | 4/2012 | Noh et al. | 375/260 |
| 2012/0099668 A1* | 4/2012 | Sakata et al. | 375/267 |

OTHER PUBLICATIONS

3GPP TS 36.211 V8.2.0, 3rd Generation Partnership Project Technical Specification Group Radio Access Network; Evolved Universal Terrestrial Radio Access (E-UTRA) Physical Channels and Modulation (Release 8), Mar. 2008, section 5.5.*

Dateki Takashi et al: "New OFDM Channel Estimation Method by Adding a Virtual Channel Frequency Response" IEEE 2006, pp. 1-5.

International Search Report and Written Opinion correlating to PCT/IB2009/053233 dated May 26, 2010.

* cited by examiner

INTEGRATED CIRCUIT WITH CHANNEL ESTIMATION MODULE AND METHOD THEREFOR

FIELD OF THE INVENTION

The field of this invention relates to an integrated circuit comprising channel estimation module, and a method therefor, for generating at least one channel estimation signal. In particular, the field of the invention relates to an integrated circuit comprising a channel estimation module, and a method therefor, for generating at least one channel estimation signal based on at least one of a plurality of pilot signals within concurrent resource elements.

BACKGROUND OF THE INVENTION

In wireless transmission systems such as orthogonal frequency division multiplexed (OFDM) and orthogonal frequency division multiple access (OFDMA) transmission systems, as well as single-carrier frequency division multiple access (SC-FDMA) transmission systems, an available carrier frequency band is divided into multiple smaller sub-carrier frequency bands. Multiple signals may then be modulated onto these sub-carrier frequency bands and simultaneously transmitted over the available carrier frequency band.

Ideally, the signal received by a receiver matches the transmitted signal. However, in real communication channels, such as a wireless transmission channels, the received signal will vary based on the particular propagation properties of the communication channel, such as the presence of signal interference and multipath reflections. Accordingly, in many OFDM systems, the receiver will perform a channel estimation process to determine the effect that the channel has on a received signal. From such a channel estimation, the receiver is then able to determine how to compensate the received signal for channel fading etc. in order to retrieve the proper shape of the originally transmitted signal.

One way in which this channel estimation may be accomplished is for the receiver to know in advance the 'modulation' shape of at least part of a transmitted signal. However, transmitted data is typically random and unpredictable, and so is not suitable for this purpose. One solution is to embed a known symbol pattern (often referred to as a pilot sequence) into the transmitted signal. In this manner, by examining the effect of the channel on this embedded known symbol pattern within the received signal, the receiver may be able to estimate an effect of the communication channel on the rest of the received signal, thereby allowing it to determine how to compensate for the communication channel effect.

FIG. 1 illustrates an example of a block diagram of a known channel estimation circuit 100 for an OFDM receiver. The channel estimation circuit 100 receives as an input a demodulation reference signal (DMRS) 110 comprising a pilot signal in a form of a known reference symbol modulated onto a sub-carrier signal. IDFT circuitry 120 transforms the modulated DMRS signal 110 into the time domain. Filter circuitry 130 then performs a filtering operation on the time domain signal to filter out noise from the pilot signal, and thereby improve the accuracy of the channel estimation signal. DFT circuitry 140 then transforms the filtered time domain signal back into the frequency domain to generate a channel estimation signal 150.

A problem with performing such DFT based channel estimation on a pilot sequence is an effect known as the "edge effect", whereby after filtering is performed in the time domain, for example by the filter circuitry 130, when the signal is transformed back into the frequency domain using a DFT, for example by the DFT circuitry 140, the estimated communication channel information exhibits high Mean Square Error (MSE) at the edges of the frequency domain signal. This undesirable phenomenon increases with the allocation size. FIG. 2 illustrates an example of a plot of the MSE for a traditional frequency domain channel estimation approach 210 and a plot of the MSE for a typical DFT-based channel estimation approach 220. As illustrated, whilst the DFT-based channel estimation approach 220 performs adequately within the central region of the allocation, the MSE at each edge of the plot for the DFT-based channel estimation approach 220 is very poor, and significantly worse than that for the traditional frequency domain channel estimation approach 210.

SUMMARY OF THE INVENTION

The present invention aims to provide an integrated circuit comprising channel estimation module, a communication unit comprising such channel estimation module and a method therefor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION

An example will now be described with reference to a wireless communication unit, such as a base transceiver station, within a wireless communication network. However, it will be appreciated that the examples herein described are not limited to use within such a communication unit, and may equally be applied to alternative devices arranged to perform channel estimation within a communication system such as, by way of example only, a mobile telephone handset, etc. Furthermore, because the example apparatus implementing the present invention is, for the most part, composed of electronic components and circuits known to those skilled in the art, circuit details will not be explained in any greater extent than that considered necessary as illustrated below, for the understanding and appreciation of the underlying concepts of the invention and in order not to obfuscate or distract from the teachings of the invention.

Figure 1:
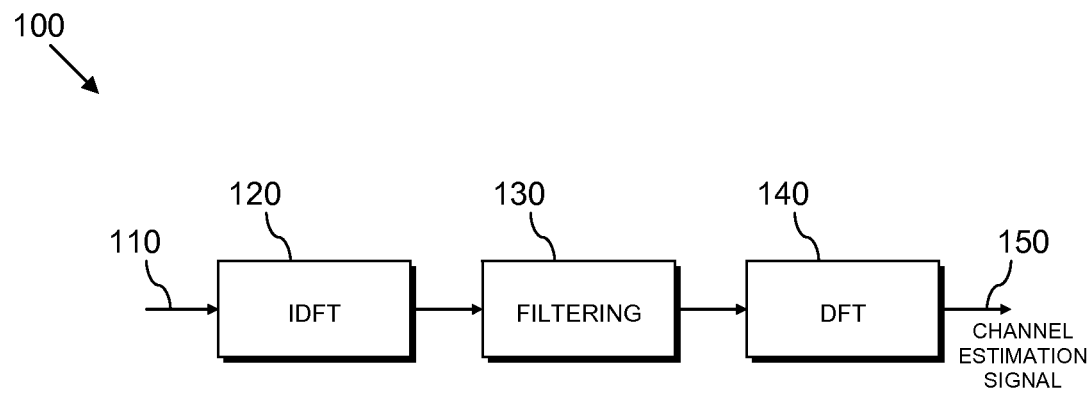
FIG. 1 illustrates an example of a block diagram of a known channel estimation circuit.
Figure 2:
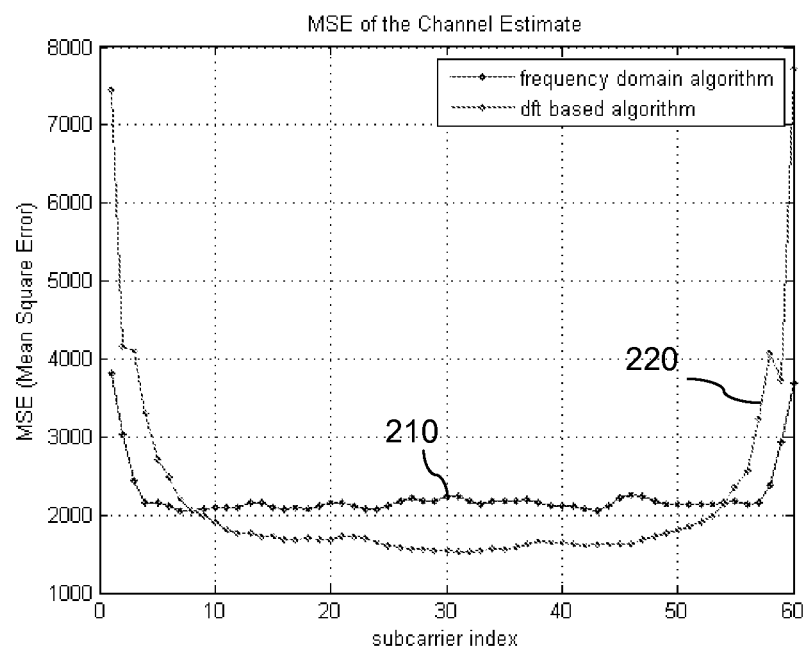
FIG. 2 illustrates an example of a plot of the Mean Square Error (MSE) for a typical discrete Fourier transform (DFT)-based channel estimation approach.
Figure 3:
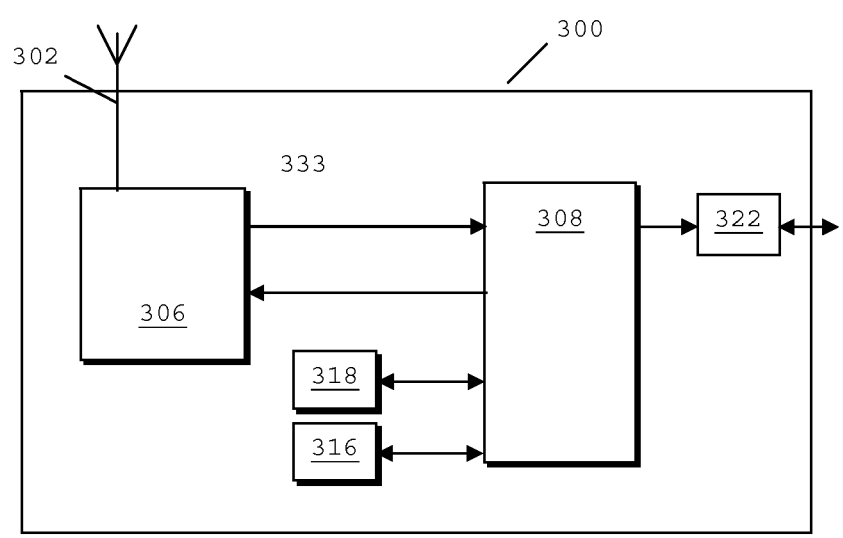
FIG. 3 illustrates an example of a simplified block diagram of part of a communication unit.

Referring to FIG. 3, there is illustrated an example of a simplified block diagram of part of a communication unit 300. The communication unit 300, in the context of the illustrated example, is a base transceiver station comprising an antenna 302. As such, the communication unit 300 contains a variety of well known radio frequency components or circuits 306, operably coupled to the antenna 302. The communication unit 300 further comprises signal processing module 308, and an Iub interface 322 for communication with, for example, a radio network controller (not shown).

For completeness, the signal processing module 308 is coupled to a memory element 316 that stores operating regimes, such as decoding/encoding functions and the like and may be realised in a variety of technologies such as random access memory (RAM) (volatile), (non-volatile) read only memory (ROM), Flash memory or any combination of these or other memory technologies. A timer 318 is typically coupled to the signal processing module 308 to control the timing of operations within the communication unit 300.

In accordance with some examples, the communication unit 300 is arranged to operate within a frequency division system, and in particular an orthogonal frequency division multiplexing (OFDM) communication system. However, the communication unit 300 may be arranged to operate within a communication system that uses an alternative modulation scheme, such as an orthogonal frequency division multiple access (OFDMA) communication system or a single-carrier frequency division multiple access (SC-FDMA) communication system, Referring now to FIG. 4, there is illustrated a simplified block diagram of an example of transmit chain module 400 for transmitting data within, say, an OFDM system. The transmit chain module 400 comprises a modulator 410 arranged to receive bits to be transmitted 405, and to encode those data bits 405 into symbols. For example, the modulator 410 may be arranged to encode the data bits 405 using binary phase shift keying (BPSK), in which one bit is encoded to each symbol, quadrature phase shift keying (QPSK), in which two bits are encoded to each symbol, or a quadrature amplitude modulation (QAM) scheme, in which multiple bits are encoded to each symbol. These data symbols are then output by the modulator 410 in the form of an encoded symbol stream 415 for transmission. In addition to the data symbols, the modulator 410 further includes within the encoded symbol stream for transmission pilot signals as described in greater detail below. The encoded symbol stream 415 is then provided to inverse fast Fourier transform (IFFT) module 420, which performs an inverse fast Fourier transform operation on the encoded symbol stream 415, thereby converting it from the frequency domain to the time domain to generate an encoded time domain signal for transmission 425.

The time domain signal for transmission 425 is then provided to a cyclic prefix addition circuit 430, which adds a cyclic prefix to the beginning of each data slot. The addition of the cyclic prefix extends the effective length of each data slot, thereby allowing multipath portions of the subsequently received signal to settle before the next data slot is transmitted. As a result, inter-symbol interference (ISI) caused by multipath interference may be substantially eliminated.

The extended time domain signal is then transmitted over the air by antenna 440. For example, the extended time domain signal may be modulated onto an appropriate radio frequency (RF) carrier signal by RF modulation circuitry (not shown) prior to being transmitted by antenna 440. Additional/alternative module elements may be included within the transmit chain 400 to support alternative modulation schemes, such as DFT pre-coding module 450 in the case of, say, SC-FDMA.

Figure 5:
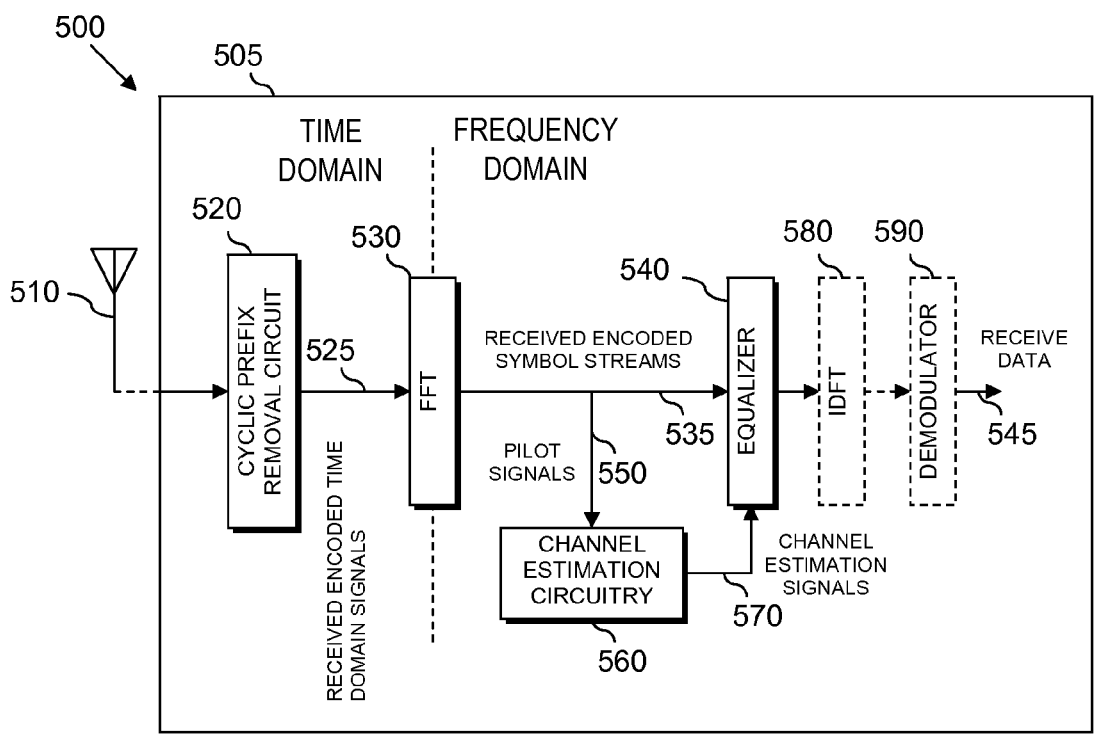
FIG. 5 illustrates a simplified block diagram of an example of a received chain module.

Referring now to FIG. 5, there is illustrated a simplified block diagram of an example of receiver chain module 500 for receiving data within, say, an OFDM communication system, for example as may be implemented within the RF circuits 306 of the communication unit 300 of FIG. 3. For the illustrated example, at least part of the receive chain module 500 forms a part of an integrated circuit 505.

Figure 4:
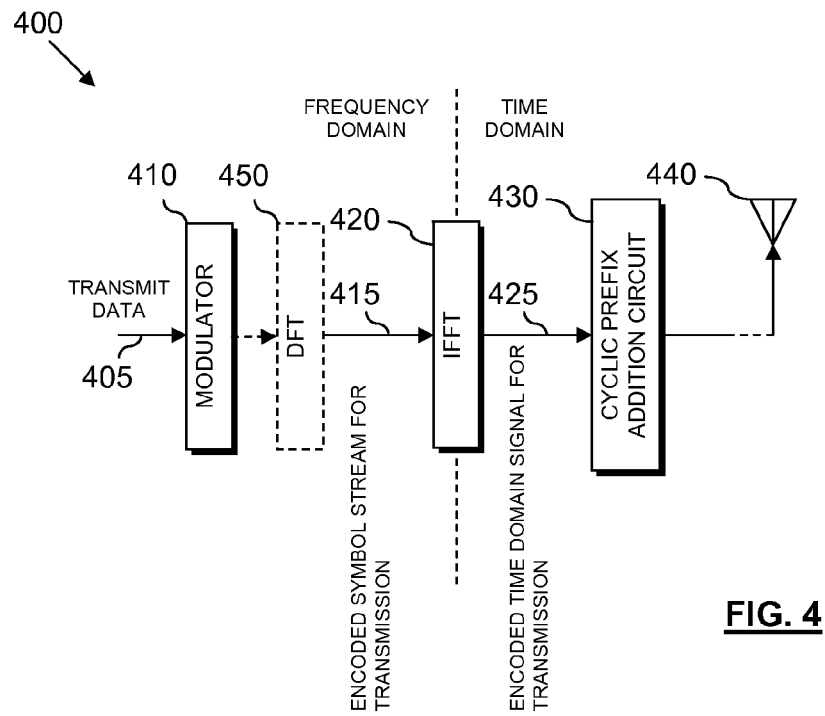
FIG. 4 illustrates a simplified block diagram of an example of a transmit chain module.

An antenna 510 is arranged to receive a transmitted signal, for example such as may be transmitted by transmit chain module 400 of FIG. 4, and to provide the received signal to the receive chain module 500. The received signal typically may comprise one or more extended time domain signals modulated on to RF sub-carrier signals. Accordingly, the received signal may be demodulated by RF demodulation circuitry (not shown) to retrieve the extended time domain signals, said extended time domain signals then being provided to cyclic prefix removal module 520.

The cyclic prefix removal module 520 is arranged to remove a cyclic prefix added to the data slots within the received signal to retrieve encoded time domain signals 525. The encoded time domain signals 525 are then provided to fast Fourier transform (FFT) module 530, which performs a fast Fourier transform operation on the encoded time domain signals 525, thereby converting information within the signals from the time domain to the frequency domain to generate encoded symbol streams 535. The received encoded symbol streams 535 are then provided to an equalizer 540, which extracts the encoded symbols within the encoded symbol streams 535 to retrieve data bits encoded therein, and outputs the retrieved data bits 545. By way of example, the data bits may be encoded within the encoded symbol stream 535 using binary phase shift keying (BPSK), in which one bit is encoded to each symbol, quadrature phase shift keying (QPSK), in which two bits are encoded to each symbol, or a quadrature amplitude modulation (QAM) scheme, in which multiple bits are encoded to each symbol. Additional and/or alternative logical elements may be included within receive chain module adapted to support alternative modulation schemes, such as IDFT module 580 and demodulator 590 in the case of, say, SC-FDMA.

Within real systems the communication channel between a transmitting antenna and a receiving antenna comprises a fading nature, resulting in degradation and distortion of the amplitude and phase of data symbols within the received signals. In order to compensate for the fading nature of the communication channel, known reference symbols, often referred to as pilot signals, are included within the encoded symbol stream 415 by the modulator 410 within the transmit chain module 400. Accordingly, these known pilot signals are present within the encoded symbol stream 535 received by the receive chain module 500. The values and placement of the pilot signals are known by both a transmitting device and a receiving device within a communication system. For example, the pilot signals may be based on a known reference symbol multiplied by a known pilot sequence, such as a Zadoff-Chu or CAZAC (constant amplitude zero autocorrelation waveform) sequence. In this manner, the receiving device has prior knowledge of at least a portion of the symbols within a received signal. The receiving device is then able to use this prior knowledge of the pilot signals to determine an impulse response for the communication channel, and to compensate for the fading nature of the communication channel in order to more accurately demodulate the encoded symbols within the received encoded symbol stream 535.

Accordingly, the receive chain module of FIG. 5 further comprises channel estimation module 560 for generating at least one channel estimation signal 570 based on at least one of a plurality of pilot signals 550 within concurrent resource elements of received encoded symbol streams 535, and to provide the at least one channel estimation signal 570 to the equalizer 540. For example, a plurality of transmitting devices may concurrently transmit pilot signals within a common carrier frequency band, and the channel estimation module 560 may be arranged to de-multiplex the pilot signals and to generate a channel estimation signal based on at least one of the de-multiplexed pilot signals. The equalizer 540 is then able to use the channel estimation signal(s) 570 to compensate for the fading nature of the respective communication channel(s) in order to more accurately demodulate the encoded symbols within the respective received encoded symbol stream(s) 535.

A problem with the use of such DFT and IDFT circuits is the "edge effect", whereby channel estimations exhibit high Mean Square Error (MSE) values at the edges of their allocation. This problem is further complicated by the multiple sub-carrier nature of OFDM transmission systems, where a receiving device may be required to perform channel estimation for a plurality of communication channels. In particular, with the evolution of current cellular networks that will allow faster data speeds and a new radio access technology that is optimized for IP (Internet Protocol) based traffic, technologies such as MIMO (Single User and Multiple User MIMO) have been introduced.

The Multiple Input Multiple Output (MIMO) systems increase transmission channel capacity by using multiple antennas in transmission and/or reception. Hence, different signals may be transmitted in the same band of frequencies at the same time. Reference signals (for example pilot signals), which may be transmitted to ease the detection process, may either be sent using different resource elements (for example as proposed for the 3$^{rd}$ Generation Partnership Project (3GPP) Long Term Evolution (LTE) Downlink channel) or mapped onto the same resource elements (for example as proposed for the 3GPP LTE Uplink channel, an example of a structure for which is illustrated in FIG. 7).

Figure 6:
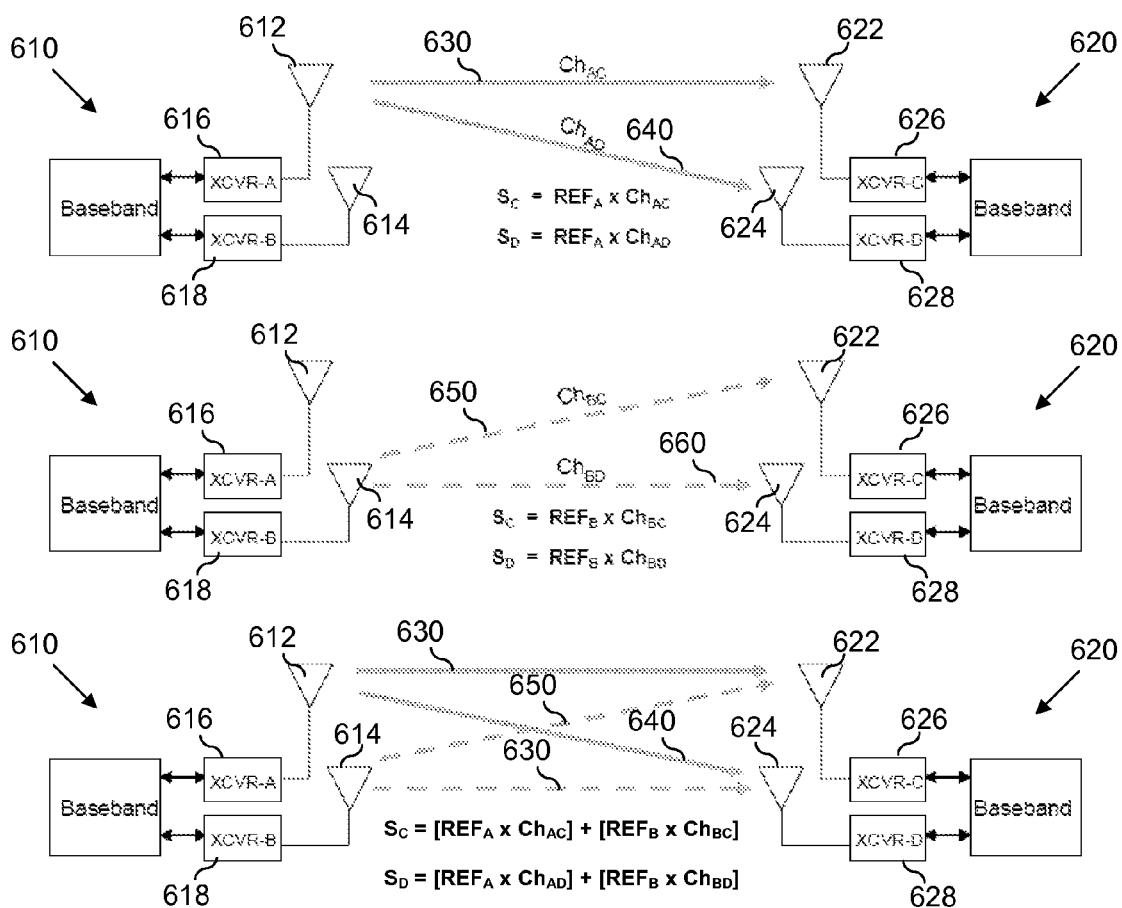
FIG. 6 illustrates an example of an orthogonal frequency division multiplexed (OFDM) transmission system.

FIG. 6 illustrates an example of, say, an OFDM transmission system comprising a base station (BS) 620 and a user equipment (UE) 610. The UE 610 comprises multiple transmit chains (providing multiple inputs for transmission channels) and the BS 620 comprises multiple receive chains (providing multiple outputs for transmission channels). Thus, together the UE 610 and the BS 620 may be arranged to operate within a multiple input multiple output (MIMO) arrangement in order to enhance link robustness and increase data rates, for example as proposed in the 3$^{rd}$ Generation Partnership Project (3GPP) Long Term Evolution (LTE) of the Universal Mobile Telecommunications System (UMTS). Accordingly, the UE 610 and BS 620 each comprise multiple antennae 612, 614, 622, 624 and multiple transceiver circuits 616, 618, 626, 628 respectively, with only two such antennae and circuits for each of the UE 610 and BS 620 shown respectively for simplicity purposes only. Furthermore, the number of transmit chains of the UE 610 need not match the number of receive chains of the BS 620. In order to successfully receive a MIMO transmission, a receiver must determine the impulse response for the communication channel from each transmitting antenna.

For the dual antenna/circuit example illustrated in FIG. 6, for each of an uplink and a downlink direction, there are a total of four communication channels for which impulse responses are required to be determined. For alternative arrangements, such as where the UE 610 and/or BS 620 comprise different numbers of antennae, a different number of communication channels may be present. The example of FIG. 6 illustrates the four uplink communication channels, for which there are two communication channels 630, 640 from the first antenna 612 of the UE 610, one to each of the antennas 622, 624 of the BS 620, and two communication channels 650, 660 from the second antenna 614 of the UE 610, also one to each of the antennas 622, 624 of the BS 620.

Figure 7:
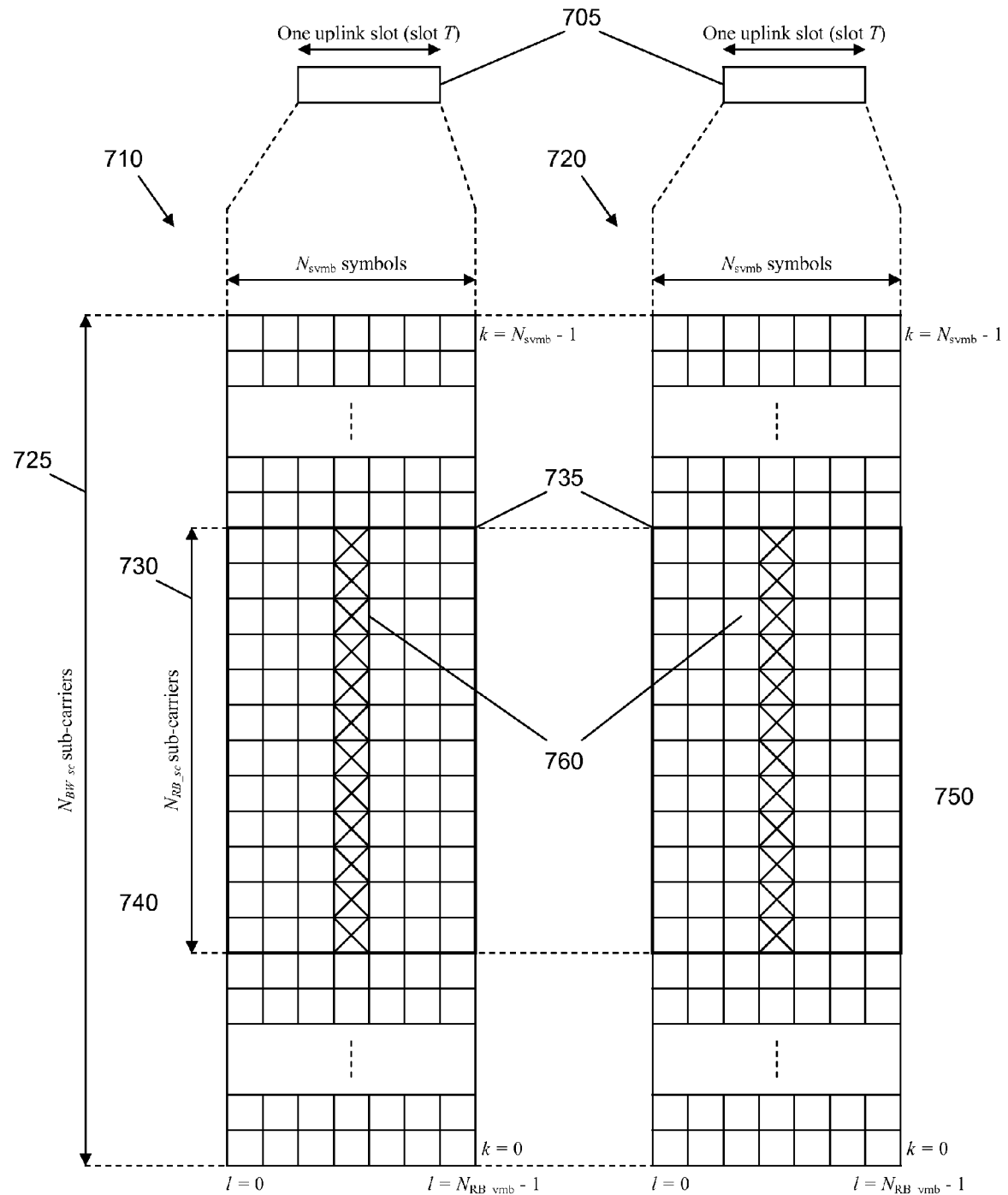
FIG. 7 illustrates an example of resource grids representing resource elements for the OFDM transmission system of FIG. 6.

Referring now to FIG. 7 there are illustrated examples of a first resource grid 710, representing resource elements for, for example, a first transmit chain of UE 610 comprising transceiver circuit 616 and antenna 612 of FIG. 6, and a second resource grid 720, representing consecutive resource elements for, for example, a second transmit chain of UE 610 comprising transceiver circuit 618 and antenna 614 of FIG. 6. For the illustrated example, the resource grids 710, 720 represent resource elements for a single uplink transmission timeslot (T) 705. Each time slot within the transmission system bandwidth comprises $N_{BW\_sc}$ sub-carrier frequencies (illustrated at 725), which are divided into resource blocks. Accordingly, within each resource grid 710, 720 there is illustrated a resource block 735, the resource block 735 comprising resource elements provided over $N_{RB\_sc}$ sub-carrier frequencies (which for the illustrated example comprises twelve sub-carrier frequencies illustrated at 730). For the illustrated example, the transmit chains of UE 610 are arranged to utilise MIMO technology, and as such the resource block 735 is allocated for use by both the transmit chains of UE 610, and the transmit chains of UE 610 are arranged to periodically transmit reference signals within particular resource elements within the resource block 735. In particular for the illustrated example, both transmit chains of UE 610 are arranged to transmit reference signals within resource elements 760 comprising a common time index (I=3) across all sub-carrier frequencies 730 of the resource block 735. Accordingly, the two transmit chains of UE 610 are arranged to transmit reference signals within the same resource elements of the resource block 735.

Accordingly, and as illustrated in FIG. 6, the first antenna 612 of UE 610 transmits a reference signal within each resource element 760 comprising, say, a time index of I=3 across all sub-carrier frequencies 730 for resource block 735 of timeslot 705. In this manner, each of the first receive chain of BS 620, comprising antenna 622 and transceiver circuit 626, and the second receive chain of BS 620, comprising antenna 624 and transceiver circuit 628, receives via one of respective communication channels 630, 640 the reference signal within resource elements comprising a known time index from the first antenna 612 of UE 610. Concurrently, the second antenna 614 of UE 610 also transmits a reference signal within each resource element 760 comprising the time index of I=3 across all sub-carrier frequencies 730 for resource block 735 of timeslot 705. In this manner, each of the first receive chain of BS 620, comprising antenna 622 and transceiver circuit 626, and the second receive chain of BS 620, comprising antenna 624 and transceiver circuit 628, receives via one of respective communication channels 650, 660 the reference signal within resource elements comprising the known time index from the second antenna 614 of UE 610.

Thus, as illustrated in FIGS. 6 and 7, each receiver chain of the BS 620 receives reference signals from both of the transmit chains of the UE 610 within concurrent resource elements. As a result, each receive chain is required to de-multiplex the channel taps in order to extract the different reference signals.

Figure 8:
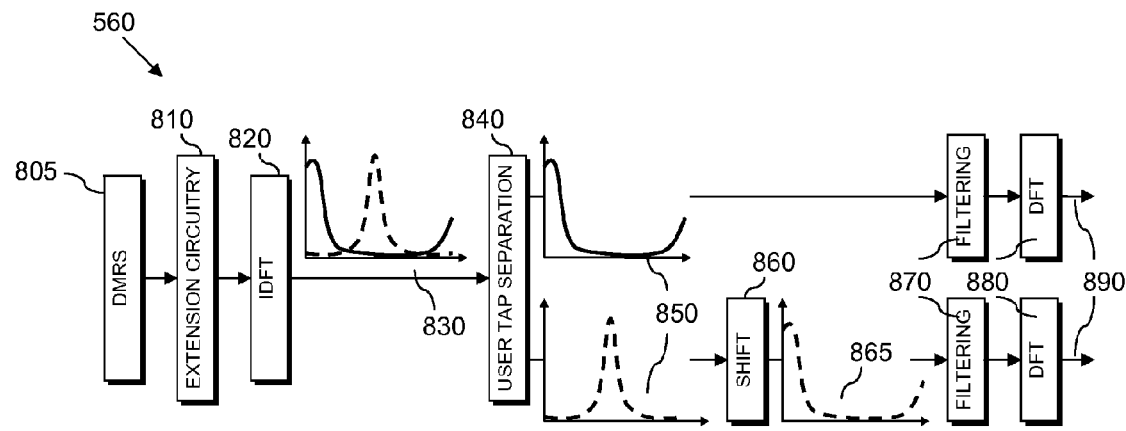
FIG. 8 illustrates an example of a channel estimation module of FIG. 5.

Referring now to FIG. 8, there is illustrated an example of the channel estimation module 560 of FIG. 5. The channel estimation module 560 comprises extension module 810 arranged to receive a demodulation reference signal (DMRS) 805, which for the example illustrated in FIG. 5 comprises at least one of a plurality of pilot signals 550 within concurrent resource elements of received encoded symbol streams 535, and to add an extension to the demodulation reference signal 805. As described in greater detail below, the extension module 810 may extend front and/or rear boundaries of the pilot signals' envelope in order to generate an extended frequency domain signal within the demodulation reference signal 805.

The channel estimation module 560 further comprises inverse discrete Fourier transform (IDFT) module 820, arranged to perform an IDFT function on the extended demodulation reference signal, in order to generate a time domain reference signal 830. For the illustrated example, the demodulation reference signal 805 comprises a plurality of pilot signals located within concurrent resource elements to which frequency modulation has been applied. Accordingly, by performing an IDFT function on the extended demodulation reference signal 805, the pilot signal components are converted from the frequency domain into the time domain. As a result, the pilot signal components within the time domain reference signal 830 are effectively shifted with respect to one another in time.

Reference and separation module 840 of the channel estimation module 560 then separates out at least one pilot signal component 850 from the time domain reference signal 830. For example, the reference and separation module 840 may be arranged to sample the time domain reference signal 830 over time intervals corresponding to the IDFT period, in order to retrieve a plurality of individual pilot signal components 850. For pilot signals modulated onto frequencies other than the first discrete frequency within the Fourier spectrum for the IDFT function, the corresponding pilot signal component 850 may, having been separated out from the time domain signal 830, be shifted by shift module 860 to relocate the pilot signal component 850 to a channel tap corresponding to the first sample interval within a shifted time domain reference signal 865. For example, the shift module 860 may be arranged to perform a circular shift function on the pilot signal component. Filtering of each separated (and where appropriate time-shifted) pilot signal component may then be performed by filter module 870. Different kinds of filtering may be implemented to reduce the noise levels. For example, a simple way of eliminating noise is to 'null' a large amount of the channel taps, depending upon either an amplitude threshold or the sub-carrier index, or both.

Discrete Fourier transform (DFT) module 880, is then arranged to perform a DFT function on each of the at least one pilot signal components to generate at least one extended intermediate channel estimation signal. The edges of at least one extended intermediate channel estimation signal, which relate to the extensions added by extension circuitry 810, may then be trimmed, for example by DFT module 880 or by a separate logical element (not shown), to generate the required channel estimation signal 570 that is arranged to comprise substantially no edge effect. Alternatively, the channel estimation signal 570 may comprise the extended channel estimation signal 890 as generated by the DFT module 880. In this manner, each pilot signal component may be transformed back from the time domain into the frequency domain to provide the channel estimation signal 570, which may then be provided to the equalizer 540. The equalizer 540 may then be able to use the channel estimation signal(s) 570 to determine an impulse response for the corresponding communication channel(s) and to compensate for the fading nature of the respective communication channel(s) in order to more accurately demodulate the encoded symbols within the respective received encoded symbol stream(s) 535.

As mentioned above, the extension module 810 extends the pilot signals' envelope to generate an extended frequency domain signal within the demodulation reference signal 805. In this manner, the edge effect resulting from the IDFT and DFT functions and the filtering performed in the time domain may be substantially confined to the extended regions of the frequency domain signal, thereby enabling the real frequency domain signal for the sub-carrier allocations containing the pilot signals to remain substantially unaffected by any 'edge' effect.

Figure 9:
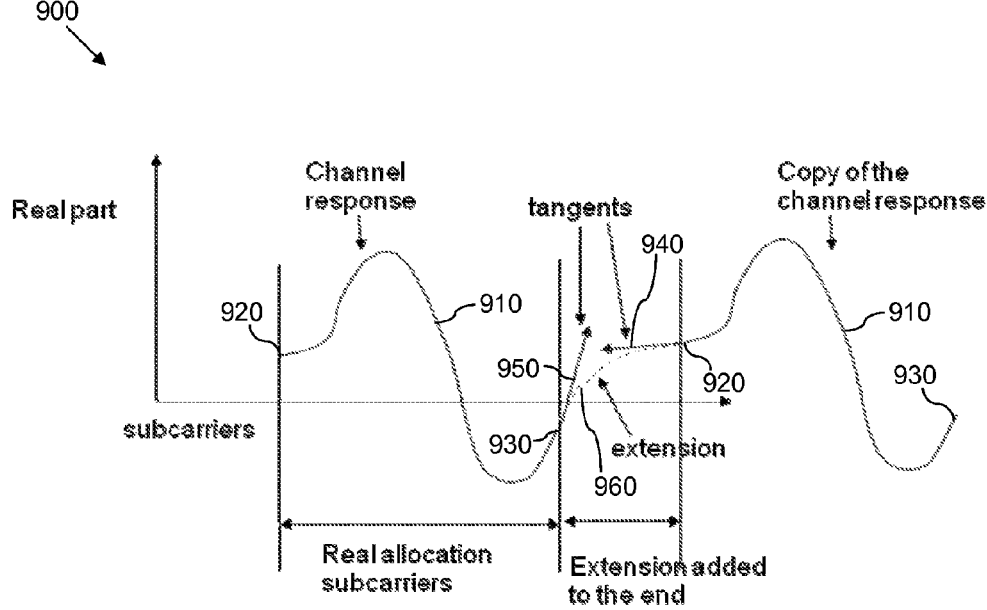
FIG. 9 illustrates an example of an extension of a frequency domain signal.

FIG. 9 illustrates an example of an extension of the frequency domain signal comprising the pilot signals within the demodulation reference signal 805. The original (real) frequency domain signal for the sub-carrier allocations containing the pilot signals, and which represents the impulse response for the communication channel(s), is illustrated at 910. In accordance with some examples of the present invention, the frequency domain signal 910 is extended such that the extended frequency domain signal comprises substantially no discontinuities in the regions around the beginning 920 or end 930 of the original frequency domain signal 910, in order to allow for the settling of the pilot signal components within the frequency domain signal during subsequent analysis thereof, and thus enabling the real frequency domain signal for the sub-carrier allocations containing the pilot signals 910 to remain substantially unaffected by any 'edge' effect.

Furthermore, and in accordance with the example illustrated in FIG. 9, the frequency domain signal 910 may be extended, such that an extension applied to the beginning of the frequency domain signal 910 and an extension applied to the end of the frequency domain signal 910 is respectively applied at substantially the same amplitude. In this manner, the frequency domain signal 910 may be extended such that any discontinuities may be substantially avoided where a beginning extension signal and an ending extension signal meet. As illustrated in FIG. 9, this may be achieved by estimating tangents 940 and 950 at the start and end of the real frequency domain signal 910, and then extending the tangents 940, 950 such that they meet and form a continuous curve 960.

In accordance with some examples, the received frequency domain signal, which may contain several users transmitting simultaneously, is extrapolated treating separately odd and even sub-carriers, for example. In the example of treating separately odd and even sub-carriers, each (odd or even) sub-carrier is the sum of H1 and H2. Hence, it is possible to extrapolate (H1+H2) directly, which provides the same result as extrapolating H1, then H2, then summing all values. This operation is possible because of the mathematical linearity of the extension creation, as shown in [Eq. 4].

For example, in a case where there are two transmitting devices, each transmitting pilot signals within resource elements comprising the same common time index across all sub-carrier frequencies (as illustrated in FIG. 7), even and odd sub-carriers may be treated separately. Thus, the received signal is the sum of two independent transmissions:

$$R = S_1 H_1 + S_2 H_2 + N \qquad \text{[Eq. 1]}$$

where $S_1$ and $S_2$ represent the transmitted sequences of the first and second transmitting devices respectively, and $H_1$ and $H_2$ represent the communication channels for the first and second transmitting devices respectively. Both $S_1$ and $S_2$ may share the same DMRS sequence root; one sequence being shifted compared to the other, so that the channel taps may be separated in the time domain after the IDFT function is performed. For example, where there are two transmitted sequences, each transmitter transmits the same known sequence (e.g. a known reference signal multiplied by a pilot sequence, such as a Zadoff-Chu or CAZAC sequence), but with the two sequences being time shifted relative to one another. This shift in the time domain may be half the allocation size, allowing best separation of the taps. Such a circular shift in the time domain translates in a phase rotation in the frequency domain as:

$$e^{i\Pi*0} = +1; \; e^{i\Pi*1} = -1 \qquad \text{[Eq. 2]}$$

Thus, where $N\_{sc}$ is the number of sub-carriers in the allocation:

$$S_1 = \begin{bmatrix} S_{11} \\ S_{12} \\ S_{13} \\ S_{14} \\ \ldots \\ S_{1N\_sc} \end{bmatrix} \text{ and } S_2 = \begin{bmatrix} S_{21} \\ S_{22} \\ S_{23} \\ S_{24} \\ \ldots \\ S_{2N\_sc} \end{bmatrix} = \begin{bmatrix} +S_{11} \\ -S_{12} \\ +S_{13} \\ -S_{14} \\ \ldots \\ -S_{1N\_sc} \end{bmatrix} \qquad \text{[Eq. 3]}$$

and the received signal at the receive antenna (R) multiplied by the conjugate of the reference sequence ($S_1$) y may be given by:

$$y = \begin{bmatrix} y_1 \\ y_2 \\ y_3 \\ y_4 \\ \ldots \\ y_{N\_sc} \end{bmatrix} = R * \overline{S_1} = \begin{bmatrix} H_{11} + H_{21} \\ H_{12} - H_{22} \\ H_{13} + H_{23} \\ H_{14} - H_{24} \\ \ldots \\ H_{1N\_sc} - H_{2N\_sc} \end{bmatrix} + N * \overline{S_1} \qquad \text{[Eq. 4]}$$

Figure 10:
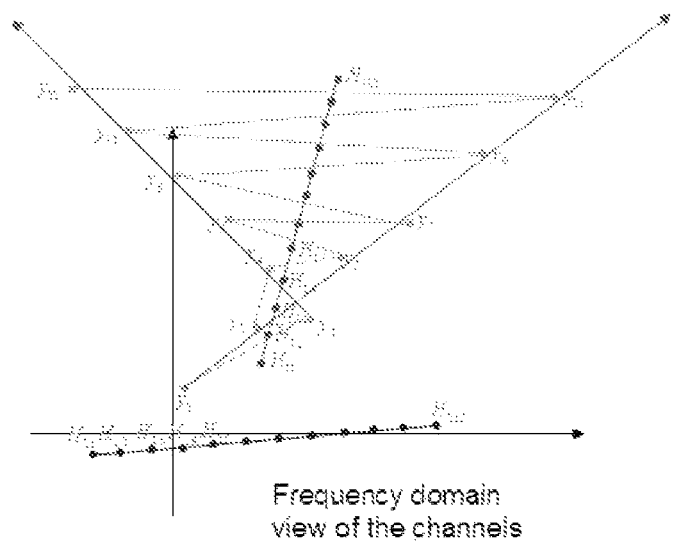
FIGS. 10 and 11 illustrate frequency domain views of pilot signals within a demodulation reference signal.

FIG. 10 illustrates the frequency domain view of the pilot signals. As can be seen, y is split between even and odd data streams, the odd data stream corresponding to sub-carriers where $y_x = S_{2x} + S_{1x}$, and the even data stream corresponding to sub-carriers where $y_x = S_{2x} + S_{1x}$, x being the sub-carrier index.

Figure 11:
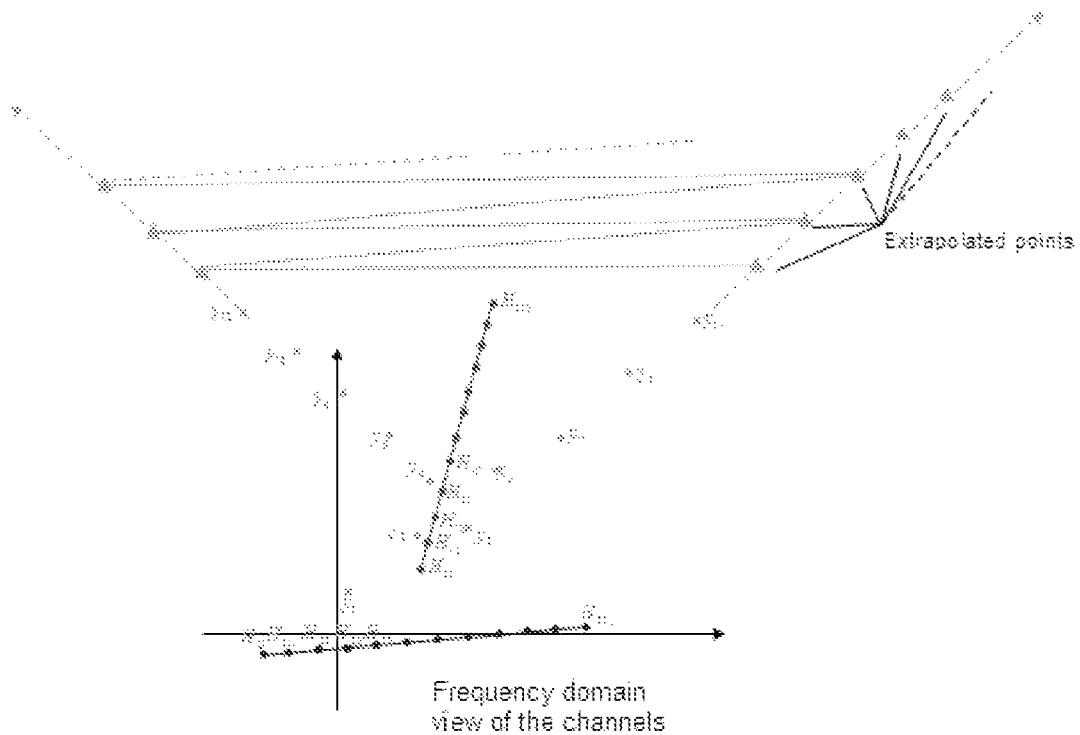

The odd and even streams of the demodulation reference signal y can be extrapolated separately to determine extensions for each of the separate pilot signals, as illustrated in FIG. 11, and then each of the extrapolated odd and even streams may be re-mixed and appended to the initial demodulation reference signal y.

Figure 12:
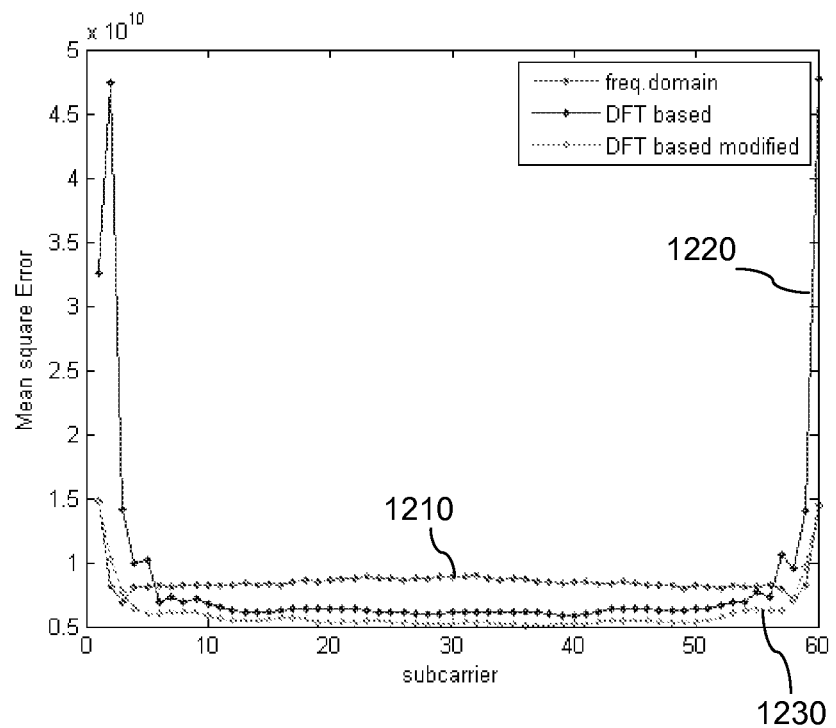
FIG. 12 illustrates an example of MSE plots for a traditional frequency domain channel estimation approach, a traditional DFT based channel estimation approach and a DFT based channel estimation approach.

Referring now to FIG. 12 there is illustrated an example of Mean Square Error (MSE) plots for a traditional frequency domain channel estimation approach 1210, a traditional DFT based channel estimation approach 1220 and a DFT based channel estimation approach 1230. As can be seen, whilst the traditional DFT based channel estimation approach 1220 performs adequately within the central region of the allocation, the MSE at each edge of the plot for the traditional DFT based channel estimation approach 1220 is very poor, and significantly worse than that for the traditional frequency domain channel estimation approach 1210. However, the DFT based channel estimation approach according to the illustrated example 1230 not only performs adequately within the central region of the allocation, but also performs as well as the traditional frequency domain channel estimation approach 1210 at the edges, but without the complexity and costs associated with the frequency domain channel estimation approach.

Figure 13:
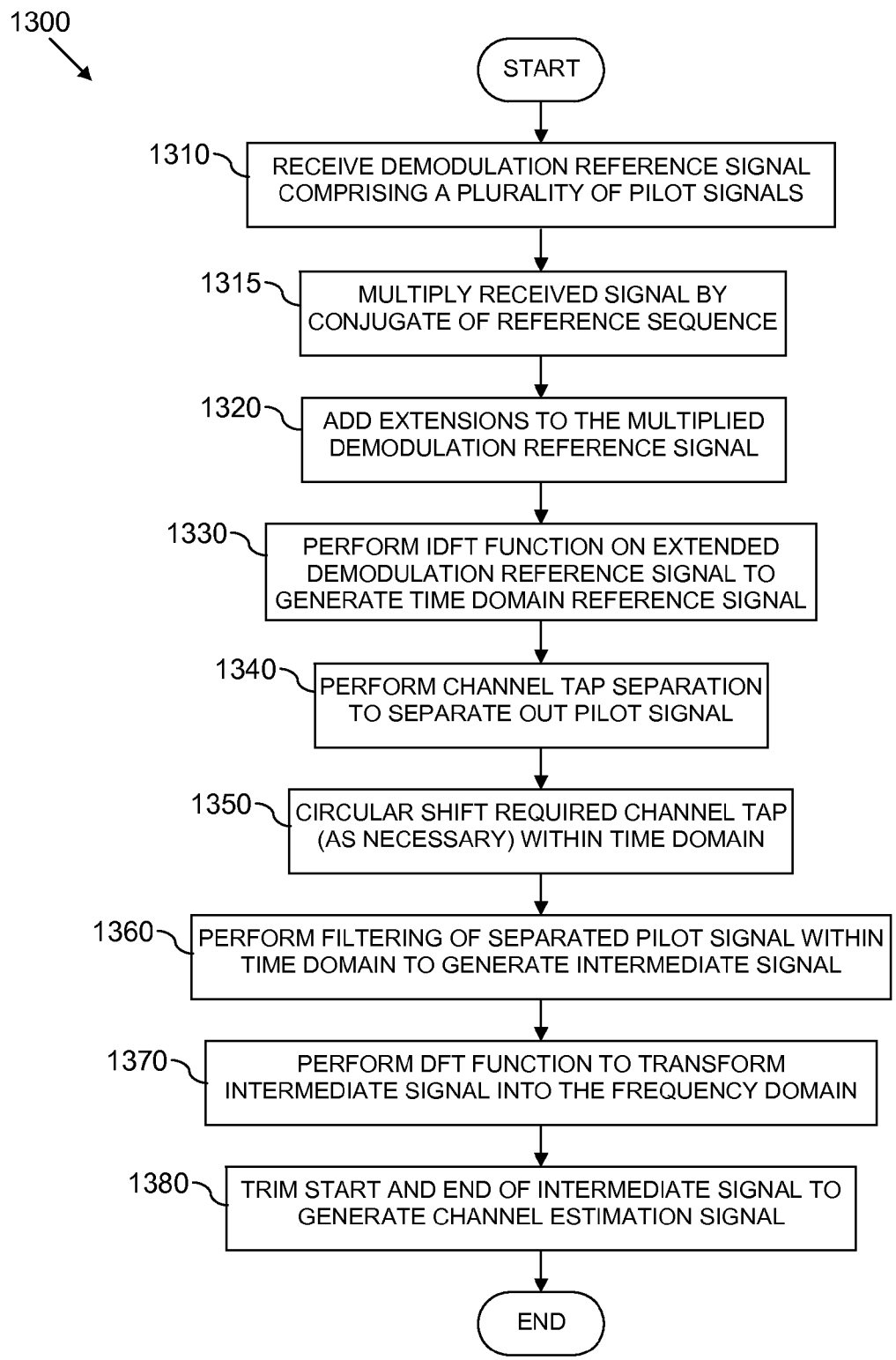
FIG. 13 illustrates an example of a simplified flowchart of a method for generating a channel estimation signal.

Referring now to FIG. 13, there is illustrated an example of a simplified flowchart 1300 of a method for generating a channel estimation signal based on at least one of a plurality of pilot signals within concurrent resource elements. The method starts and moves to step 1310 with the receipt of a demodulation reference signal comprising a plurality of pilot signals. Next, in step 1315, the received reference signal is multiplied by the conjugate of the reference sequence. The method then moves on to step 1320, where extensions are added to the multiplied demodulation reference signal. An IDFT function is then performed in order on the extended demodulation reference signal to generate a time domain reference signal, in step 1330. The method then moves on to step 1340, where channel tap separation is performed to separate out at least one pilot signal component from the time domain reference signal. Next, in step 1350, if necessary, a circular shift is applied to the separated pilot signal component(s) within the time domain. Thereafter, in step 1360, filtering of the separated pilot signal component(s) is performed, also within the time domain, to generate an intermediate signal. A DFT function is then performed on the intermediate signal comprising the pilot signal component to transform it from the time domain into an extended channel estimation signal within the frequency domain, in step 1370. The intermediate signal is then trimmed to generate a channel estimation signal in step 1380, and the method then ends.

Accordingly, the examples of a method and apparatus hereinbefore described enable the generation of a channel estimation signal for a communication channel based on a demodulation reference signal comprising a plurality frequency division multiplexed pilot signals using IDFT functions and DFT functions, within the channel estimation process, thus enabling a simplified channel estimation circuit design, whilst substantially alleviating the problem of high Mean Square Error (MSE) at the edges of the channel estimation allocation when transformed back into the frequency domain.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "rear," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Thus, it is to be understood that the architectures depicted herein are merely exemplary, and that in fact many other architectures can be implemented that may substantially achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit comprising:
   a channel estimation circuit to generate at least one channel estimation signal based on at least one of a plurality of pilot signals within concurrent resource elements,
   wherein the channel estimation circuit comprises:
      an extension circuit to receive a demodulation reference signal comprising the plurality of pilot signals, to add an extension to the demodulation reference signal, to separately extrapolate odd and even streams of the demodulation reference signal to determine respective extensions for separate pilot signals respective to the odd and even streams, and to remix and append the extrapolated odd and even streams to the demodulation reference signal;
      an inverse discrete Fourier transform (IDFT) circuit to perform an inverse discrete Fourier transform function on the extended demodulation reference signal to generate a time domain reference signal;
      a reference signal separation circuit to separate out at least one pilot signal component from the time domain reference signal; and
      a discrete Fourier transform (DFT) circuit to perform a discrete Fourier transform function on the at least one pilot signal component to generate at least one extended channel estimation signal.

2. The integrated circuit of claim 1 wherein the DFT circuit is further to trim at least one edge of the at least one extended channel estimation signal in order to generate the channel estimation signal.

3. The integrated circuit of claim 1 wherein the extension circuit is further to:
   determine at least one extension for separate frequency domain signals for the pilot signals individually, and
   sum extensions for separate frequency domain signals to generate an overall extension for the demodulation reference signal.

4. The integrated circuit of claim 1 wherein the plurality of pilot signals are based on a known reference symbol multiplied by a known pilot sequence.

5. The integrated circuit of claim 4 wherein the extension circuit is further to multiply the received demodulation reference signal by a conjugate of the pilot sequence prior to said adding the extension to the demodulation reference signal.

6. The integrated circuit of claim 4 wherein the pilot sequence comprises one of a Zadoff-Chu or constant amplitude zero autocorrelation waveform sequence.

7. The integrated circuit of claim 1 wherein the channel estimation circuit further comprises a shift circuit to perform a circular shift function on the at least one pilot signal component separated out from the time domain reference signal to relocate the at least one pilot signal component to a channel tap corresponding to a first sample interval.

8. The integrated circuit of claim 1 wherein the channel estimation circuit further comprises:
a filter circuit to filter the at least one pilot signal component separated out from the time domain reference signal.

9. The integrated circuit of claim 1 wherein the channel estimation circuit is adapted for use within a receiver chain circuit to receive data within an orthogonal frequency division multiplexing (OFDM) communication system.

10. The integrated circuit of claim 1 wherein the channel estimation circuit is adapted for use within a receiver chain circuit to receive data within a multiple input multiple output (MIMO) communication system.

11. A communication unit comprising the integrated circuit of claim 1.

12. A method for generating a channel estimation signal, the method comprising:
receiving a demodulation reference signal comprising a plurality of pilot signals;
determining respective extensions for separate pilot signals, wherein said determining the respective extensions comprises separately extrapolating odd and even streams respective to the separate pilot signals of the demodulation reference signal;
remixing and appending the extrapolated odd and even streams to the demodulation reference signal to generate an extended demodulation reference signal;
performing an inverse discrete Fourier transform (IDFT) function on the extended demodulation reference signal to generate a time domain reference signal;
separating out at least one pilot signal component from the time domain reference signal; and
performing a discrete Fourier transform (DFT) function on the at least one pilot signal component to generate at least one extended channel estimation signal.

13. The method of claim 12 further comprising:
trimming at least one edge of the at least one extended channel estimation signal to generate the channel estimation signal.

14. The method of claim 12 further comprising:
extending a frequency domain signal of the demodulation reference signal, wherein said extending the frequency domain signal provides one or more of the frequency domain signal is extended to a length of a power of two, the extended frequency domain signal comprises no discontinuities in a region around a beginning or an end of the original frequency domain signal, and
an extension applied to the beginning of the frequency domain signal and an extension applied to the end of the frequency domain signal start and end respectively at a same amplitude.

15. The method of claim 12 further comprising:
determining at least one extension for separate frequency domain signals for the pilot signals individually; and
generating an overall extension for the demodulation reference signal by summing extensions for separate frequency domain signals.

16. The method of claim 12 further comprising:
performing a circular shift function on the at least one pilot signal component separated out from the time domain reference signal to relocate the at least one pilot signal component to a channel tap corresponding to a first sample interval.

17. The integrated circuit of claim 1 wherein the extension circuit adds the extension to the demodulation reference signal by estimating tangents at a start and an end of a real frequency domain representation of the demodulation reference signal and forming the extension as a curve based on the tangents.

18. The method of claim 12 wherein the adding the extension comprises:
estimating tangents at a start and an end of a real frequency domain representation of the demodulation reference signal.

* * * * *